United States Patent
Pan et al.

(10) Patent No.: US 7,933,445 B2
(45) Date of Patent: Apr. 26, 2011

(54) COLOR GAMUT MAPPING/ENHANCEMENT TECHNIQUE USING SKIN COLOR DETECTION

(75) Inventors: Hao Pan, Camas, WA (US); Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1060 days.

(21) Appl. No.: 11/731,095

(22) Filed: Mar. 29, 2007

(65) Prior Publication Data

US 2008/0166042 A1 Jul. 10, 2008

Related U.S. Application Data

(60) Provisional application No. 60/879,644, filed on Jan. 9, 2007.

(51) Int. Cl.
*G06K 9/00* (2006.01)
*G06K 9/36* (2006.01)

(52) U.S. Cl. ...................................... 382/167

(58) Field of Classification Search .................. 382/162, 382/164, 165, 167, 190, 254, 260–264; 345/589, 345/590, 600–604, 619, 622; 358/1.9, 504, 358/512, 515, 518, 520, 523, 525, 529, 530; 347/15, 43; 348/802, E9.024
See application file for complete search history.

(56) References Cited

U.S. PATENT DOCUMENTS

| | | | | |
|---|---|---|---|---|
| 5,239,370 | A * | 8/1993 | Yamaguchi | 358/518 |
| 5,596,428 | A * | 1/1997 | Tytgat et al. | 358/518 |
| 6,719,392 | B2 * | 4/2004 | Qiao | 347/15 |
| 6,819,458 | B1 * | 11/2004 | Tanaka et al. | 358/518 |
| 6,961,477 | B2 * | 11/2005 | Martinez-Uriegas et al. | 382/283 |
| 7,554,705 | B2 * | 6/2009 | Edge | 358/529 |
| 7,573,620 | B2 * | 8/2009 | Presley et al. | 358/518 |
| 7,733,526 | B2 * | 6/2010 | Kim et al. | 358/1.9 |
| 7,768,671 | B2 * | 8/2010 | Bala et al. | 358/1.9 |
| 2004/0208363 | A1 | 10/2004 | Berge et al. | |
| 2005/0117798 | A1 | 6/2005 | Patton et al. | |
| 2005/0195212 | A1 | 9/2005 | Kurumisawa et al. | |
| 2005/0232482 | A1 | 10/2005 | Ikeda et al. | |
| 2005/0244053 | A1 | 11/2005 | Hayaishi | |
| 2007/0030499 | A1 * | 2/2007 | Hori | 358/1.9 |
| 2008/0166042 | A1 * | 7/2008 | Pan et al. | 382/164 |
| 2008/0166044 | A1 * | 7/2008 | Pan et al. | 382/167 |
| 2010/0110312 | A1 * | 5/2010 | Muijs et al. | 348/802 |

FOREIGN PATENT DOCUMENTS

WO  WO 02/099557  12/2002

* cited by examiner

*Primary Examiner* — Amir Alavi
(74) *Attorney, Agent, or Firm* — Chernoff, Vilhauer, McClung & Stenzel

(57) ABSTRACT

A method for mapping/enhancing the color of an image to be displayed on a display includes receiving an image having a plurality of pixels where each of the pixels has a plurality of color components. The image is processed using a pair of gamut color mapping operations in combination with skin-tone pixels detection to modify the image in a suitable manner for presentation on the display.

29 Claims, 7 Drawing Sheets

The 3D plot of a 33x33x33 skin color lookup table (left) and three 2D slices of the 3D LUT with Blue=0, 128, and 255, respectively (right).

The actual skin color region and the skin region defined by a pixel-based method in a color wheel.

The overall block diagram of the skin-cognizant algorithm

The 3D plot of a 33x33x33 skin color lookup table (left) and three 2D slices of the 3D LUT with Blue=0, 128, and 255, respectively (right).

The color wheel and *saturation* (*S*) and *hue* (*H*).

2D LUT for $f_{RY}(\cdot,\cdot)$. The x-axis is the first argument, and the y-axis is the second argument. White: 1; black: 0; gray: between 0 and 1.

2D LUT for $f_{RM}(\cdot,\cdot)$. The x-axis is the first argument, and the y-axis is the second argument. White: 1; black: 0; gray: between 0 and 1.

The 2D LUT for $f_{BM}(\cdot,\cdot)$, $f_{BC}(\cdot,\cdot)$, $f_{GC}(\cdot,\cdot)$, $f_{BM}(\cdot,\cdot)$.
The x-axis is the first argument, and the y-axis is the second argument.
White: 1; black: 0; gray: between 0 and 1.

(a) The color gamut in the x-y chart.
(b) Illustration of skin score of the colors in (a).

COLOR GAMUT MAPPING/ENHANCEMENT TECHNIQUE USING SKIN COLOR DETECTION

CROSS-REFERENCE TO RELATED APPLICATIONS

This application claims the benefit of U.S. Provisional App. No. 60/879,644, filed Jan. 9, 2007.

BACKGROUND OF THE INVENTION

The present invention relates to display color gamut mapping and image color enhancement.

An image color enhancement algorithm maps color of an image to new more saturated colors. Image color enhancement is also a three dimensional mapping technique. The input of color enhancement is 3 dimensional and the output is 3 dimensional.

The advance of flat panel display (FPD) technology is able to make the color gamut of a display wider than the sRGB/ITU-R BT.709 color gamut that is widely used by the current HDTV and Internet/computers standards. A color gamut mapping algorithm (GMA) maps RGB (red, blue, green) display values of a color in a color gamut to new RGB values in a new gamut. The RGB display values before and after a GMA usually are different, and may or may not represent the same physical color. The input of a GMA is also 3 dimensional and the output of a GMA is also 3 dimensional.

A GMA from small gamut to big gamut is an image color enhancement algorithm, and has the same challenges as an image color enhancement algorithm without a display gamut change Most existing current image color enhancement techniques typically boost saturation of colors while keeping the colors' hue substantially unchanged. In the hue-saturation color wheel such as the one shown in FIG. 1, a typical color enhancement technique moves colors outward on the radial direction as shown by the arrows. Essentially, the color enhancement algorithm increases the input images' dynamic range by increasing the color saturation of the pixels.

The techniques used to enhance the color enhancement of an image are based upon modification of individual pixels. When the color of a pixel is enhanced to a new color, the conversion from the old color to the new color for each pixel is a predetermined fixed adjustment for the entire image or for the entire video.

By way of example, televisions have built-in color enhancement techniques to enhance unsaturated colors in certain content and let viewers set their color preferences. Because the human eye is very sensitive to the skin color, it is important for a color enhancement technique to render skin colors properly. If they are essentially calibrated at the input, then they are generally not increased in saturation. Preventing this change in saturation of skin colors can be called protection from saturation or simply saturation. It is also desirable for a color enhancement technique to separately adjust skin colors and non-skin colors using different characteristics.

Some color enhancement techniques have the capability of protecting skin colors. These techniques are typically pixel-based. When the color of a pixel is enhanced to a new color, the conversion from the old color to the new color is fixed, and is not affected by other pixels. Because pixel-based color enhancement techniques with skin color protection cannot overcome the issue that the colors of skin and non-skin are highly overlapped, these techniques cannot effectively protect skin tones to maintain their calibration with the input image.

The pixel-based algorithms do not work effectively. Specifically, to avoid generating visible contouring artifacts in the areas of an image where skin and neighboring non-skin colors are mixed, both the skin color region in the color space and the gradual transition region between the skin color region and the non-skin color region have to be set very wide. Typically, the skin color and transition regions cover nearly half of the color gamut, as illustrated in FIG. 2. On the other hand, some true skin colors are missed in the skin color region and therefore remain unprotected. Consequently, many non-skin colors are improperly protected while many skin colors are improperly enhanced by the enhancement techniques.

DETAILED DESCRIPTION OF PREFERRED EMBODIMENT

Figure 1:
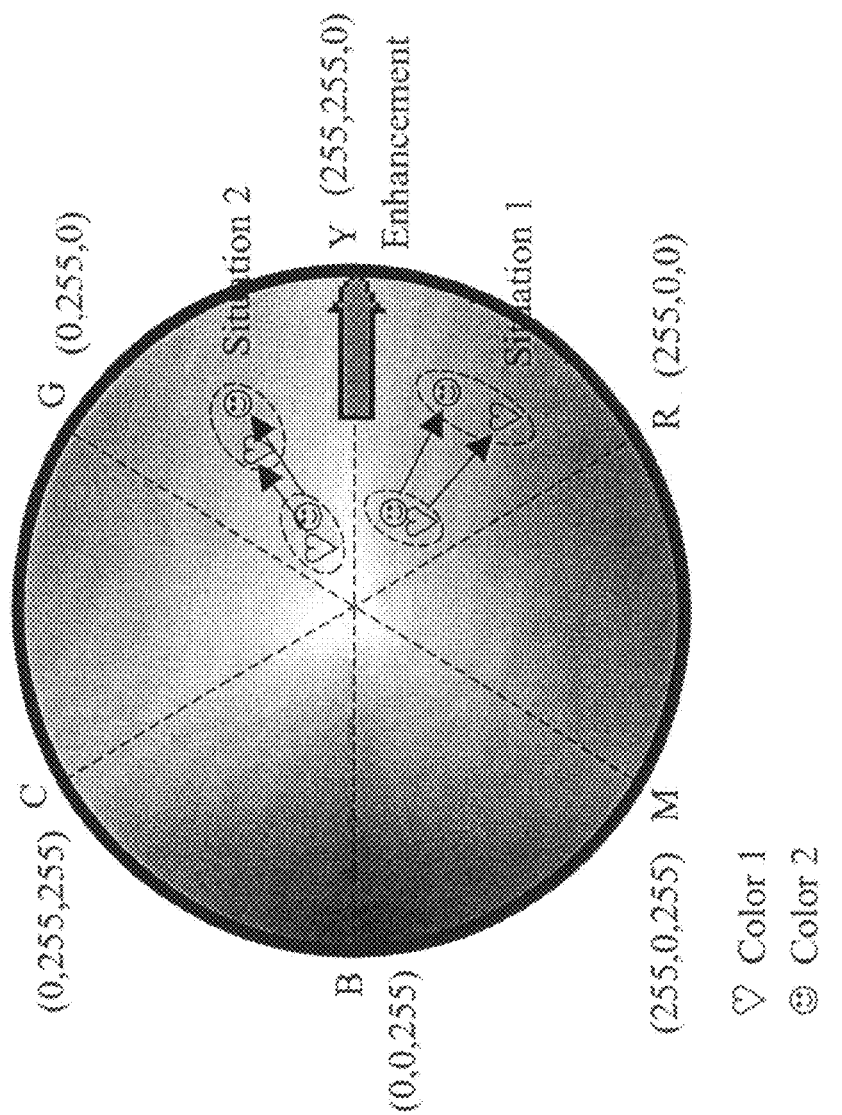
FIG. 1 illustrates two adjacent colors in the hue-saturation color wheel that are not adjacent in the wheel after color enhancement.
Figure 2:
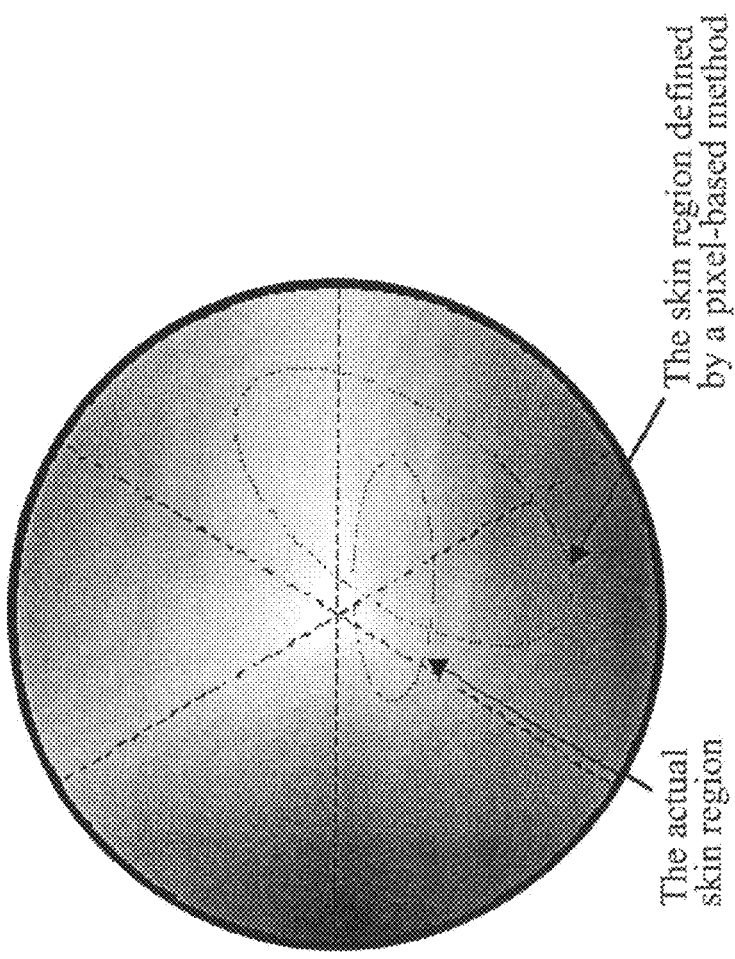
FIG. 2 illustrates the actual skin color region and the skin region defined by a pixel based technique in a color wheel.

An observation was made that a typical pixel based GMA/color enhancement technique results in two similar pixel colors before enhancement being modified to different values that are significantly less similar after enhancement. FIG. 1 illustrates two different situations. Situation 1 illustrates the case when two pixel colors are similar in saturation but have different hues, and situation 2 illustrates the case when two colors have the same hue and similar saturations.

In both situations, the two pixel colors are close to each other in the color wheel before GMA/color enhancement. The two colors are spaced significantly apart from each other in the color wheel after color enhancement, indicating that the two enhanced colors are less similar after GMA/enhancement than they were before GMA/enhancement.

As a result, single pixel-based GMA/color enhancement techniques also enhance artifacts while it enhances colors. The pixels in spatial flat areas of the non-enhanced image tend to have similar colors, and the differences among the similar colors are not very visible to the viewer. Because the pixel-based GMA/color enhancement techniques enlarge the differences of similar colors, the resulting differences of the enhanced image may become very visible, and consequently a flat area of the image before GMA/enhancement may not be very flat anymore after GMA/enhancement. Specifically, pixel-based color GMA/enhancement techniques are prone to amplifying noise and structural artifacts, generally referred to as noise, that is otherwise generally unobservable in the flat area to become readily observable after color enhancement. Also, the pixel-based color GMA/enhancement technique tends to amplify and generate quantization artifacts in the smooth regions before GMA/enhancement that become relatively rough after GMA/enhancement. In addition, amplifying compression artifacts that are generally unobservable in the non-enhanced image become generally noticeable after GMA/enhancement. The compression artifacts include, for example, contours, which are typically due to insufficient bit-depth, blocky artifacts, which are common for block-based compression schemes, and ringing artifacts, which are due to loss of high frequency caused by compression.

The GMA/color enhancement technique results in an increased color saturation for an image, and as a result tends to increase the noise and artifacts that are in the image, which are often not observable at the lower dynamic range. Accordingly, it is desirable to reduce the generation of artifacts while enhancing the color of the image with an increased saturation or dynamic range. While decreasing the generation of artifacts in the increased dynamic range image, the technique should also preserve image details which are generally high frequency in nature and akin to 'noise'.

A skin-cognizant GMA/color enhancement is a particular GMA/color enhancement that may include one or more of the following characteristics:

rendering skin colors faithfully;
utilizing the expanded color gamut for GMA and/or enhancing non-skin colors for color enhancement;
reducing the generation of contouring or other artifacts; and a flexible implementation.

It is noted that in the code value space the GMA function and the color enhancement function for protecting skin tones have opposite effects, namely decreasing or increasing the code values.

To fulfill these characteristics, a skin-cognizant GMA/color enhancement technique may be based upon a pair (or more) of GMA/color enhancement algorithms. One conservative GMA/color enhancement algorithm (referred to herein as GMA0) may substantially reproduce the input physical colors, while the other aggressive GMA/color enhancement algorithm (referred to herein as GMA1) may utilize a greater extent of the expanded color gamut or aggressively enhance the input colors. Both of these GMAs are usually designed in such a manner that they operate independent of skin colors. In addition, a skin-cognizant operator may be used together with the pair of GMAs to produce a final mapping from one color space to another color space or enhancement while maintaining skin tones with a suitable set of colors.

Figure 3:
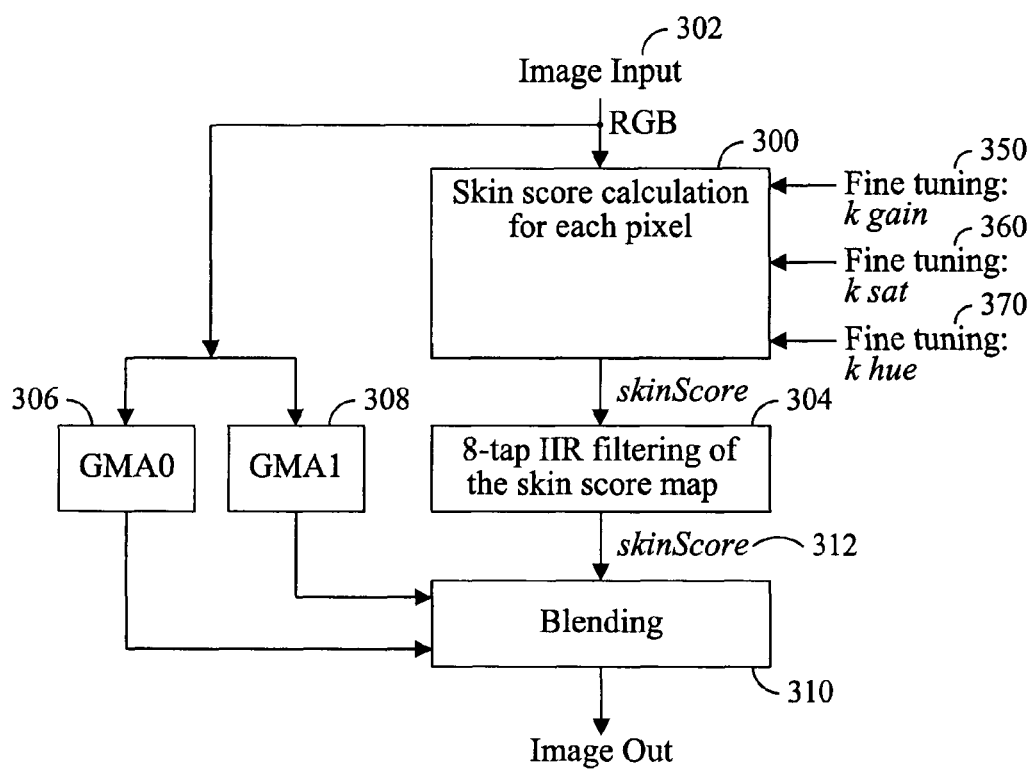
FIG. 3 illustrates a block diagram of the proposed technique.

The block diagram of a skin-cognizant GMA/color enhancement is shown in FIG. 3. First, the technique calculates a skin score 300 of the input color 302. Then, the skin score 300 is spatially filtered by an 8-tap IIR spatial filter 304 (for example) to reduce contouring artifacts. At the same time, the conservative GMA0 306 and aggressive GMA1 308 are computed. Finally, the outputs of the two GMAs 306 and 308 are blended 310 together in accordance with the output of the filtering 304 in a manner that protects the skin tones of the image (described in detail later).

To protect skin colors during blending 310, it is desirable to identify which color is the skin color. The system may assign a scalar between 0 and 1 to every color to give a "score" 312 on the likelihood this color is a skin color. This scalar value may be referred to herein as a "skin score". Specifically, for skin score, 0 is a confident non-skin color, 1 is a confident skin color, and larger than 0 and smaller than 1 indicates a range of skin color confidence.

There are two reasons it is preferable to use a non-binary skin score indicator. First, the skin and non-skin colors are highly overlapped, especially due to the effects of lighting. While some colors are more likely to be skin colors than other colors, there is not any devoted skin color, so the best way to describe skin colors is a scalar. Second, a scalar provides a smooth transition from skin colors and non-skin colors in the color space to reduce generating contouring artifacts in the image.

Based on the skin score 312, in the skin-cognizant GMA, a mapped color is a blending of the colors mapped by two GMAs, namely, GMA0 306 and GMA1 308. GMA0 is a conservative GMA that substantially or exactly reproduces the input color space (such as sRGB skin tones) in the wider color gamut of the display and therefore acts to "protect" skin colors. GMA1 is an aggressive GMA1 that stretches the input color space of the input colors (such as sRGB non-skin tones) to the wide color gamut. Mathematically, the blending may be expressed as:

$$y=GMA(c)=skinScore(c)*GMA0(c)+(1-skinScore(c)*GMA1(c) \quad (1)$$

where skinScore (c) is the skin core of the input color c.

A linear mapping approach in GMA0 may be used to reproduce the sRGB color in the wide color gamut. Specifically, the input RGB may first go through sRGB gamma mapping to a linear luminance domain, multiplied by the 3×3 conversion matrix, and modified back from the linear domain to the non-linear domain by inverse sRGB gamma mapping. Note that if sRGB is not 100% inside the new wide color gamut, then negative components in the 3×3 conversion matrix may occur when the gamut is reduced relative to the code values.

GMA1 may be an advanced GMA that makes use of all or a substantial part of the expanded wide color gamut. The system may permit the input image to go through without any added processing, if desired. In this case, the wider color gamut of the more saturated primaries will stretch all colors processed by GMA1 to be more saturated. To further reduce the possible contouring artifacts happening, the system may spatially filter 304 the skin score of pixel with its neighbors. After this filtering, the skin score is not only smooth in the color space but also smoother spatially.

The skin score 312 may be adjusted by a set of factors. The skin score and skin color probability are preferably scalars between 0 and 1, and skin score is based on skin color probability, but the system should modify this value for a more accurate determination of the skin score. Other factors can be used to adjust the skin score.

The gain control may be determined by setting a scalar k_gain 350 between 0 and 1 to control the "gain" of skin score, according to the viewer preference and wide color gamut. Specifically, the system may modify skin score as:

$$skinScore_{new}=k\_gain*skinScore \quad 0 \leq k \leq 1 \quad (2)$$

This skinScore$_{new}$ may be plugged into equation 1. The parameter k is controlled by the viewers. If k_gain is set to 1, then skinScore$_{new}$=skinScore; if k is set to 0, then skinScore$_{new}$=0, and the result is the aggressive GMA y=GMA1(c) for all pixels, since non are considered skin codes to be processed by GMA0.

One may modify a parameter to adjust the saturation. One may set a scalar k_sat 360 between 0 and 2 to control the range of skin colors on the saturation axis. All the saturation values prior to sending to the skin score look up tables are first multiplied with k_sat. The default k_sat is 1. When k_sat is smaller than 1, the range of skin colors on the saturation axis is increased; when is bigger than 1, the range of skin colors on the saturation axis is reduced.

One may modify a parameter to adjust the hue of the skin color region in the color space. One may set a scalar k_hue 370 between 0 and 2 to control the range of skin colors on the saturation axis. All the hue values prior to sending to the skin score look up tables are first multiplied with k_hue. The default setting is 1. When k_hue is smaller than 1, the range of skin colors on the hue axis is increased; when is bigger than 1, the range of skin colors on the hue axis is reduced.

Figure 4:
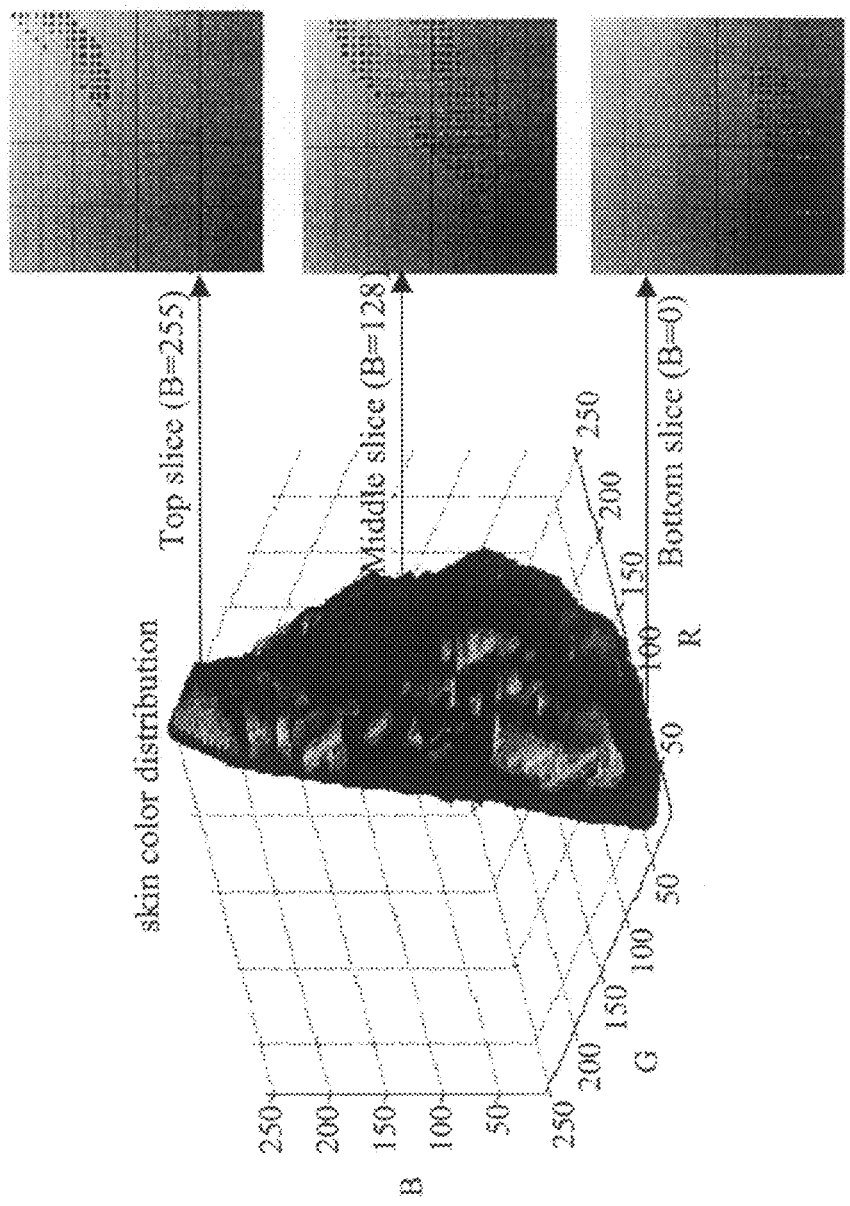
FIG. 4 illustrates a look up table of skin color.

A test set of skin color probability is shown in the FIG. 4. The skin color probability distribution provides baseline information for roughly deciding the location and size that the skin color region should be in the color space. From the skin color probability shown in FIG. 4, it may be observed that most skin colors are R>G>B or R>B>G, and those close to the neutral have higher probability. Therefore, skin score should be positive when R>G>B or R>B>G, and are bigger when a color is close to the neutral.

The skin score is also affected by the target wide color gamut. Because the skin and non-skin colors are highly overlapped, many colors are not either 100% skin colors or 100% non-skin color with skin score bigger than 0 and smaller than 1. Equation (1) shows that the skin-cognizant algorithm maps these colors as the mixture of GMA0 and GMA1 weighted by skin score 312. GMA0 is the sRGB reproduction in the new expanded color gamut, which is independent from the expanded color gamut once displayed. The GMA0 technique parameters, however, do depend on the color gamut primary values. GMA1 is dependent on the expanded color gamut. Therefore, if the system makes skin score 312 independent from the expanded wide color gamut, then the mapped colors code values change when the expanded wide color gamut changes. The measured colors on the display do not change. On the other hand, if the system wants the mapped colors to be relatively constant when the expanded wide color gamut changes, then the skin score may be adjusted according to different wide color gamuts.

Skin score may be adjustable to different viewer groups as well. Some viewer group prefers more saturated colors than the others and adjusting skin score can fulfill this preference. The skin score is the function of RGB. Therefore, the form of this function may be chosen to make the skin score easily adjustable on the wide color gamut and viewer preference.

Skin score may be stored and calculated by a look-table (LUT) in the skin-cognizant algorithm. If the system directly uses RGB color space, the LUT would be 3 dimensional. It is complex to make a 3D LUT adjustable, and therefore 3D LUT is problematic to use for the adjustability that the may be desired in the skin scores. Therefore, the system may directly use RGB color space and the 3D LUT is not highly desirable.

To simplify the determination, the skin score conceptually may be modeled in a modified HSV color space. Then one 3D LUT could be replaced by three 2D LUTs and two 1D LUTs. Several smaller 2D LUTs and 1D LUTs are easier to adjust than one big 3D LUT.

Figure 5:
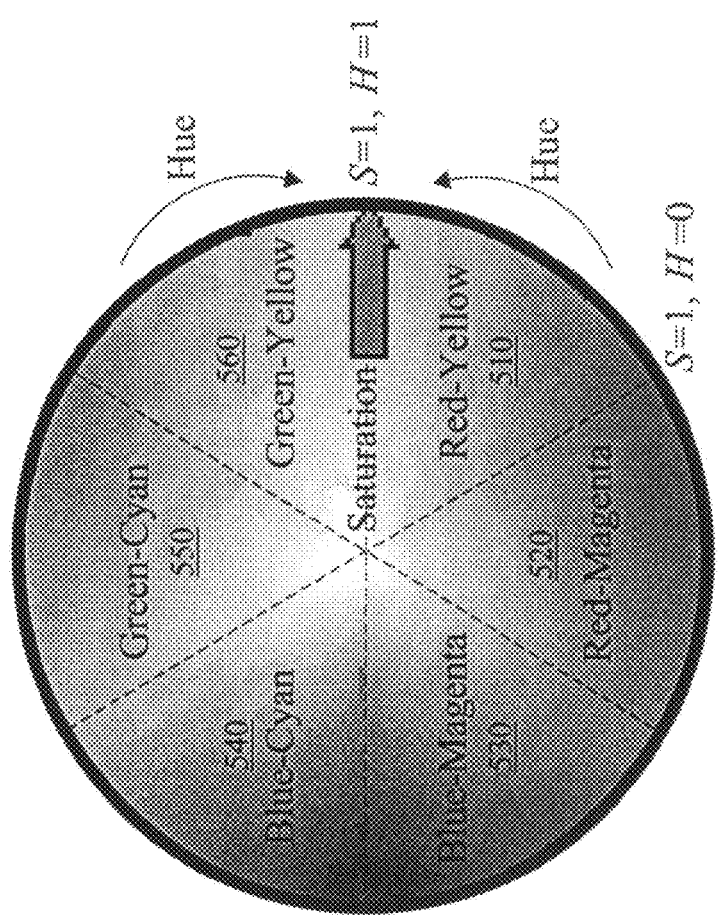
FIG. 5 illustrates a color wheel.

First the system divides the RGB color space into six areas, then defines hue (H), saturation (S) and value (V) separately in the six areas (note that while S and V are the standard definition, H is different), and finally the system defines the skin score for each area. First the red-yellow area is discussed in detail and then the remaining five areas. The six color areas and S and H are illustrated in FIG. 5.

All the colors in the red-yellow area 510 are either reddish or yellowish. The saturation, hue and value are defined as:

$$S = \frac{r-b}{r}$$

$$H = \frac{g-b}{r-b}$$

$$V = r$$

S and H are between 0 and 1. When S is 0, r=g=b and the color is the white; when S is 1, b is 0 and the color is most saturated. When H is 0, g=b and the color is red; when H is 1, g=b and the color is yellow.

It has been determined that skin score can be well modeled by the following equation:

$$skinScore_{RY}(H, S, V) = \begin{cases} f_{RY}(S, H) & \text{when } V \text{ is not too small or too big} \\ f_{RY}(S*k_S, H*k_H) & \text{when } V \text{ is too small or too big} \end{cases}$$

where $k_S$ and $k_H$ vary with V.

The system can use RGB to represent the above equation as:

$$\text{skinScore} = f_{RY}((r-b)*p(r),(g-b)*q(r-b)) \qquad (2)$$

The above equation can be implemented by concatenation of 1D LUTs and 2D LUTs. The calculation uses one 2D LUT for $f_{RY}(\cdot,\cdot)$, and two 1D LUTs for $p(\cdot)$ and $q(\cdot)$.

Figure 6:
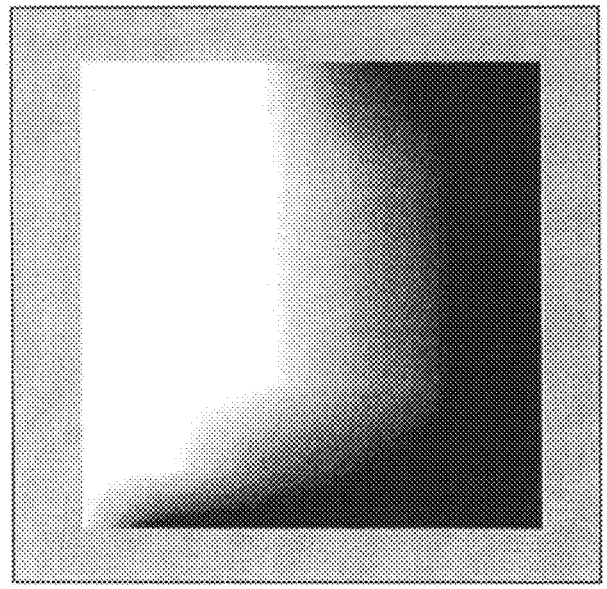
FIG. 6 illustrates a color gamut in the x-y chromaticity chart and skin scores.

The 2D LUT $f_{RY}(\cdot,\cdot)$ is illustrated in FIG. 6.

The red-magenta (red>blue>green) area 520 may be represented as follows:

$$S = \frac{r-g}{r} \qquad (3)$$

$$H = \frac{b-g}{r-g}$$

$$V = r$$

$$skinScore_{RM}(H, S, V) = f_{RM}((r-g)*p(r), (b-g)*q(r-g))$$

The calculation uses a new 2D LUT for $f_{RM}(\cdot,\cdot)$ and the same two 1D LUTs for $p(\cdot)$ and $q(\cdot)$.

The calculation for the blue-magenta (blue>red>green) area 530 may be defined as follows:

$$S = \frac{b-g}{g} \qquad (4)$$

$$H = \frac{r-g}{b-g}$$

$$V = b$$

$$skinScore_{BM}(H, S, V) = f_{BM}((b-g)*p(b), (r-g)*q(b-g))$$

The calculation uses a new 2D LUT for $f_{BM}(\cdot,\cdot)$ and the same two 1D LUTs for $p(\cdot)$ and $q(\cdot)$.

The calculation for the blue-cyan (blue>green>red) area 540 may be characterized as follows:

$$S = \frac{b-r}{b} \qquad (5)$$

$$H = \frac{g-r}{b-r}$$

$$V = b$$

$$skinScore_{BC}(H, S, V) = f_{BC}((b-r)*p(b), (g-r)*q(b-r))$$

The calculation uses a 2D LUT for $f_{BC}(\cdot,\cdot)=f_{BM}(\cdot,\cdot)$ and the same two 1D LUTs for $p(\cdot)$ and $q(\cdot)$.

Figure 8:
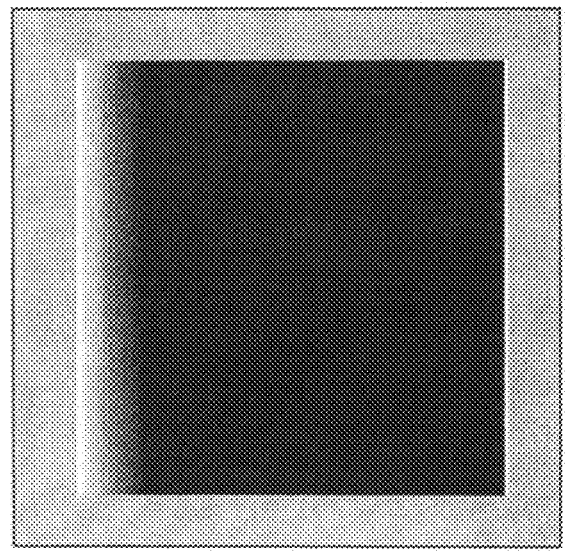
FIG. 8 illustrates a 2D LUT.
Figure 9:
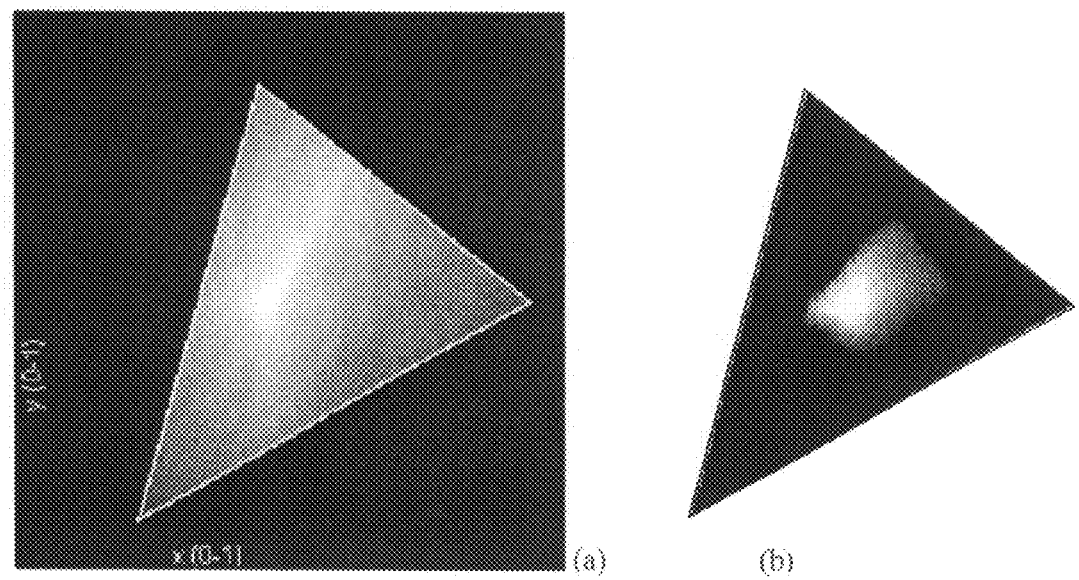
FIG. 9 illustrates a color gamut and skin score.

The 2D LUT $f_{BC}(\cdot,\cdot)$ is illustrated in FIG. 8. In this case, $f_{BD}(\cdot,\cdot)$ and $f_{BM}(\cdot,\cdot)$ are the same.

The calculation for the green-cyan (green>blue>red) area 550 may be characterized as follows:

$$S = \frac{g-r}{g} \quad (6)$$

$$H = \frac{b-r}{g-r}$$

$$V = g$$

$$skinScore_{GC}(H, S, V) = f_{GC}((g-r)*p(g), (b-r)*q(g-r))$$

The calculation uses a 2D LUT for $f_{BC}(\cdot,\cdot)=f_{GC}(\cdot,\cdot)$ and the same two 1D LUTs for $p(\cdot)$ and $q(\cdot)$.

The 2D LUT $f_{GC}(\cdot,\cdot)$ is illustrated in FIG. 8. In this case, $f_{GC}(\cdot,\cdot)$ and $f_{BM}(\cdot,\cdot)$ are the same.

The calculation for the green-yellow (green>red>blue) area 560 may be characterized as follows:

$$S = \frac{g-b}{g} \quad (7)$$

$$H = \frac{r-b}{g-b}$$

$$V = g$$

$$skinScore_{GY}(H, S, V) = f_{GY}((g-b)*p(g), (r-b)*q(g-b))$$

The calculation uses a 2D LUT for $f_{BC}(\cdot,\cdot)=f_{GY}(\cdot,\cdot)$ and the same two 1D LUTs for $p(\cdot)$ and $q(\cdot)$.

The skin score for the sRGB color gamut is illustrated in 2D in FIG. 6. One may notice most skin colors are in the red-yellow and red-magenta areas and close to the white point.

Calculating skin score may use both a liner buffer and LUTs. As previously shown, the algorithm divides the color space into six color areas, and each of the six color areas uses one 2D LUT and two 1D LUTs. Because all the six color areas share the same 1D LUTs to compute $p(\cdot)$ and $q(\cdot)$, totally there are two 1D LUTs. While the red-yellow and red-magenta color areas use their own 2D LUTs, and the rest four color areas share one 2D LUTs, totally there are three 2D LUTs.

GMA0 may use two 1D LUTs for gamma correction and inverse gamma correction. The IIR filter for skin score requires one line buffer for storing previous pixels' skin scores.

One may use a filter to smooth skin score in order to prevent any potential contouring artifacts. To reduce the hardware cost, the filter is chosen as an IIR filter. Specifically, the formula is $$\text{skin score }(x,y) = a_0 * \text{skin score }(x,y) + a_1 * \text{skin score }(x-1,y) + \quad (9)$$
$$a_2 * \text{skin score }(x-2,y) + a_3 * \text{skin score }(x-2,y-1) +$$
$$a_4 * \text{skin score}(x-1,y-1) + a_5 * \text{skin score }(x,y-1) +$$
$$a_6 * \text{skin score }(x+1,y-1) + a_7 * \text{skin score }(x+2,y-1)$$

where x is the row index, y is the column index, and $a_0+a_1+a_2+a_3+a_4=1$.

This IIR filter uses one line buffer for skin score, but does not require line buffers for RGB.

In order to reduce the artifacts resulting from GMA/image enhancement, a modified technique may incorporate spatial information with the GMA/color enhancement. In addition, the spatial information may be obtained using multi-channel decomposition of the image. More specifically, the preferred technique may decompose an image into multiple images. The one image may incorporate a pixel-based GMA/color enhancement technique. The color enhanced image and the non-enhanced image are then combined back into a single image.

Figure 7:
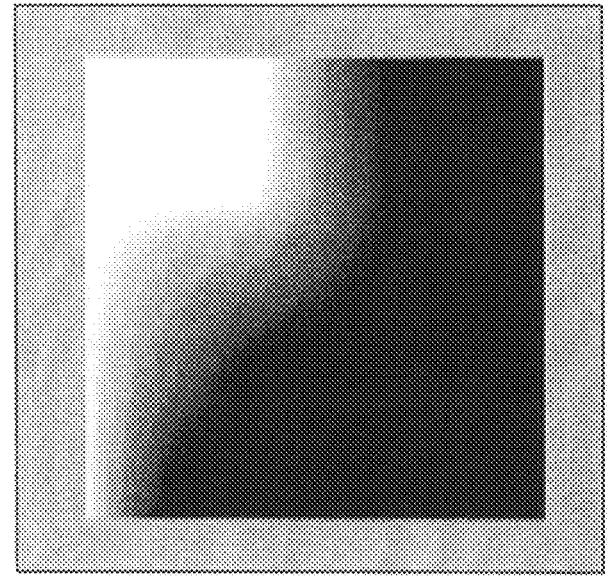
FIG. 7 illustrates a skin color-cognizant gamut mapping apparatus with two channel decomposition.

Referring to FIG. 7, specifically, the input image 700 is first decomposed into lowpass 710 and highpass 720 images by a sigma filter 730. The lowpass image, containing no details or artifacts, goes through the GMA 740. The highpass image, containing details and noise and artifacts, does not go through the GMA and will be added 760 back to the color mapped lowpass image 750 to generate the new image 770. Therefore, the noise in the highpass image 720 is not enhanced by the GMA. In addition, the highpass image 720 can go through coring 780 processing to reduce noise and artifacts.

The sigma filter 730 decomposes the input image into the lowpass and highpass images. The sigma filter was first published by Lee (J. S. Lee, "Digital image enhancement and noise filtering by use of local statistics," in *IEEE Trans. Pattern Analysis and Machine Intelligence,* Vol. PAMI-2, No. 2, pp. 165-168, March, 1980). The sigma filter utilizes a 1-D or 2-D rectangular window, where the current pixel I(x,y) is at the center of the window. The sigma filter compares all the pixels I(i,j) in the window with the central pixel I(x,y), and only averages those pixels whose value differences with the central pixel I(x,y) is within a threshold T. The sigma filter is a nonlinear filter. Mathematically, the output of the sigma filter, $I_{LP}(x,y)$, is calculated by $$I_{LP}(x,y) = \frac{\sum_{(i,j)\in E \,\&\, |I(i,j)-I(x,y)|<T} I(i,j)}{N(x,y)}$$

where E is the window; N(x,y) is the count of the pixels in E that satisfy the condition of $|I(i,j)-I(x,y)|<T$. The parameters of the sigma filter, the widow E and the threshold T, may be chosen empirically.

The sigma filter generates the lowpass image 710, and the highpass image 720 is obtained by subtraction 790. Because the sigma filter is a smoothing filter preserving sharp edges, the lowpass image generated by a sigma filter contains few details but contains sharp edges, and the highpass image contains details/noises/artifacts but few sharp edges. It is also to be understood that a similar technique may be used to protect skin tones when the gamut of the display is smaller than the input color gamut.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for enhancing the color of an image to be displayed on a display comprising:
   (a) using a processor to receive an image having a plurality of pixels where each of said pixels has a plurality of color components;
   (b) using said processor to modify said image with a first gamut mapping to a first color gamut;

(c) using said processor to modify said image with a second gamut mapping to a second color gamut, wherein said second color gamut is generally different than said first color gamut;
(d) using said processor to determine potential skin-tone pixels of said image;
(e) using said processor to modify said image based upon said first gamut mapping, said second gamut mapping, and said potential skin-tone pixels.

2. The method of claim 1 wherein said first gamut mapping leaves said image substantially unchanged.

3. The method of claim 1 wherein said second gamut mapping substantially changes said image to match that of an input image calibration.

4. The method of claim 1 wherein said second color gamut is generally larger than said first color gamut.

5. The method of claim 1 wherein said potential skin-tone pixels are filtered with a color space filter.

6. The method of claim 1 wherein said first gamut mapping is independent of skin-tones.

7. The method of claim 6 wherein said second gamut mapping is independent of skin-tones.

8. The method of claim 1 wherein said second gamut mapping is independent of skin-tones.

9. The method of claim 1 wherein the values associated with said potential skin-tone pixels are non-binary.

10. The method of claim 1 wherein said potential skin-tone pixels may be modified based upon a gain.

11. The method of claim 10 wherein said gain is user adjustable.

12. The method of claim 1 wherein said potential skin-tone pixels may be modified based upon a hue.

13. The method of claim 12 wherein said hue is user adjustable.

14. The method of claim 1 wherein said potential skin-tone pixels may be based upon saturation.

15. The method of claim 14 wherein said saturation is user adjustable.

16. The method of claim 1 wherein said skin-tone pixels are based upon two dimensional look up tables.

17. The method of claim 1 wherein said skin-tone pixels are also based upon one dimensional look up tables.

18. The method of claim 1 wherein the image is divided into 6 regions of a color space.

19. A method for enhancing the color of an image to be displayed on a display comprising:
(a) using a processor to receive an image having a plurality of pixels where each of said pixels has a plurality of color components;
(b) using said processor to selectively modify a pixel of said image with either a first gamut mapping to a first color gamut or a second gamut mapping to a second color gamut, wherein said second color gamut is generally different than said first color gamut, based upon the likelihood that said pixel is a skin-tone pixel of said image.

20. The method of claim 19 wherein said first gamut mapping leaves said pixel substantially unchanged once displayed.

21. The method of claim 20 wherein said skin-tone pixel is filtered with a spatial filter.

22. The method of claim 19 wherein said first gamut mapping is independent of skin-tones.

23. The method of claim 22 wherein said second gamut mapping is independent of skin-tones.

24. The method of claim 19 wherein said skin-tone pixel may be modified based upon a gain.

25. The method of claim 24 wherein said gain is user adjustable.

26. The method of claim 19 wherein said skin-tone pixel may be modified based upon a hue.

27. The method of claim 26 wherein said hue is user adjustable.

28. The method of claim 19 wherein said skin-tone pixel may be based upon saturation.

29. The method of claim 28 wherein said saturation is user adjustable.

* * * * *

UNITED STATES PATENT AND TRADEMARK OFFICE
CERTIFICATE OF CORRECTION

PATENT NO. : 7,933,445 B2  Page 1 of 1
APPLICATION NO. : 11/731095
DATED : April 26, 2011
INVENTOR(S) : Hao Pan and Scott J. Daly It is certified that error appears in the above-identified patent and that said Letters Patent is hereby corrected as shown below:

Col. 4, Lines 14-15

Change: $y = GMA(c) = skinScore(c)*GMA0(c) + (1 - skinScore(c)*GMA1(c)$ to read: $y = GMA(c) = skinScore(c)*GMA0(c) + (1 - skinScore(c))*GMA1(c)$

Col. 4, Line 48

Change: $skinScore_{new} = k\_gain*skinScore \; 0 \leqq k \leqq 1$ to read: $skinScore_{new} = k\_gain*skinScore \; 0 \leq k \leq 1$ Signed and Sealed this
Thirty-first Day of January, 2012

David J. Kappos
*Director of the United States Patent and Trademark Office*